United States Patent
Capolungo et al.

(10) Patent No.: US 10,815,784 B2
(45) Date of Patent: Oct. 27, 2020

(54) TURBINE ENGINE TURBINE ROTOR WITH VENTILATION BY COUNTERBORE

(71) Applicant: SAFRAN AIRCRAFT ENGINES, Paris (FR)

(72) Inventors: Thierry Laurent Capolungo, Moissy-Cramayel (FR); Florian Carry, Moissy-Cramayel (FR); Benjamin Cyrille Jacques Oudin, Moissy-Cramayel (FR); Myriam Pelleterat De Borde, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/885,711

(22) Filed: Jan. 31, 2018

(65) Prior Publication Data
US 2018/0238172 A1 Aug. 23, 2018

(30) Foreign Application Priority Data
Feb. 2, 2017 (FR) ...................................... 17 50875

(51) Int. Cl.
*F01D 5/06* (2006.01)
*F01D 5/08* (2006.01)
*F01D 11/00* (2006.01)

(52) U.S. Cl.
CPC ............. *F01D 5/066* (2013.01); *F01D 5/082* (2013.01); *F01D 5/087* (2013.01); *F01D 11/001* (2013.01);
(Continued)

(58) Field of Classification Search
CPC . F01D 5/08; F01D 5/066; F01D 5/082; F01D 5/087; F01D 11/001; F01D 5/085;
(Continued)

(56) References Cited

U.S. PATENT DOCUMENTS 3,765,795 A * 10/1973 Koff ........................ F01D 5/066
   416/198 R
5,350,278 A * 9/1994 Burge ..................... F01D 5/066
   416/198 A
(Continued)

FOREIGN PATENT DOCUMENTS

EP 1091089 A2 4/2001
FR 3018584 A1 9/2015
(Continued)

OTHER PUBLICATIONS

Preliminary Research Report received for French Application No. 1750875, dated Oct. 5, 2017, 3 pages (1 page of French Translation Cover Sheet and 2 page of original document).

*Primary Examiner* — Justin D Seabe
*Assistant Examiner* — Andrew J Marien
(74) *Attorney, Agent, or Firm* — Womble Bond Dickinson (US) LLP

(57) ABSTRACT

The invention relates to a turbine rotor, of a low-pressure turbine of a turbine engine for example, including a first disk, an annular seal ring including a radial flange on which is formed a scalloping defined by a plurality of scallops offering a locally increased surface, circularly distributed, said radial flange being attached to the rotor between the first disk and the second disk and a flow circuit including at least one lunule, suitable to place into fluid communication a radially inner cavity and a radially outer cavity, the lunule being formed on the radial flange of the seal ring said lunule being provided on at least one scallop.

12 Claims, 3 Drawing Sheets

(52) U.S. Cl.
CPC ...... *F05D 2240/24* (2013.01); *F05D 2240/55* (2013.01); *F05D 2260/20* (2013.01); *Y02T 50/676* (2013.01)

(58) Field of Classification Search
CPC ... F02C 7/12; F16J 15/06; F16J 15/064; F16J 15/447–4478
USPC .................................................. 415/115, 116
See application file for complete search history.

(56) References Cited

U.S. PATENT DOCUMENTS

| | | | | |
|---|---|---|---|---|
| 5,388,963 | A * | 2/1995 | Dimmick, III | .......... F01D 5/066 416/198 A |
| 6,283,712 | B1 * | 9/2001 | Dziech | .................... F01D 5/066 415/115 |
| 6,499,957 | B1 * | 12/2002 | Klingels | ................ F01D 5/066 416/198 A |
| 8,157,506 | B2 * | 4/2012 | Bart | ........................ F01D 5/082 415/116 |
| 8,382,432 | B2 * | 2/2013 | Grissino | .................. F16J 15/44 415/115 |
| 8,602,734 | B2 * | 12/2013 | Philippot | ................ F01D 5/081 415/115 |
| 2012/0201652 | A1 * | 8/2012 | Ferslew | .................. F01D 5/022 415/115 |
| 2012/0321441 | A1 * | 12/2012 | Moore | ...................... F01D 5/06 415/115 |
| 2013/0195660 | A1 | 8/2013 | Baxley et al. | |
| 2019/0085699 | A1 * | 3/2019 | Oudin | ..................... F01D 5/088 |

FOREIGN PATENT DOCUMENTS

| | | | | |
|---|---|---|---|---|
| FR | 3019584 | A1 | 10/2015 | |
| FR | 3048998 | A1 * | 9/2017 | ............ F01D 5/082 |
| WO | 20051052321 | A1 | 6/2005 | |

* cited by examiner

TURBINE ENGINE TURBINE ROTOR WITH VENTILATION BY COUNTERBORE

GENERAL TECHNICAL FIELD AND PRIOR ART

The invention generally relates to gas turbine engines, and more particularly to the ventilation of the stages of a turbine, for example a low-pressure turbine of a turbine engine. Application fields of the invention are aircraft turbojets and turboprops, and industrial gas turbines.

The general operation and the composition of such a system are known in the art and elucidated in document FR 3 018 584, the system presented hereafter being an improvement of it.

Generally, a turbine engine comprises one or more compression sections for the air induced into the engine (generally a low-pressure section and a high-pressure section). The air thus compressed is induced into the combustion chamber and mixed with fuel before being burned there.

The hot combustion gases arising from this combustion are then expanded in various turbine stages. A first expansion occurs in a high-pressure stage immediately downstream of the combustion chamber, which receives gasses at the highest temperature. The gasses are again expanded by being guided through the so-called low-pressure turbine stages.

A low-pressure turbine conventionally includes one or more stages, each being constituted by a row of fixed turbine blades, also called distributors, followed by a row of movable turbine blades, which form the rotor. The distributor deflects the gas flow collected at the combustion chamber toward the movable turbine blades at an appropriate angle and speed so as to drive in rotation these movable blades and the rotor of the turbine.

The rotor comprises several disks, four disks for example, which general comprise peripheral grooves such as cells into which the movable blades are slotted.

The rotor of the turbine is subjected to a very hot thermal environment, much higher than the maximum temperatures allowed by the parts of the rotor.

That is why the rotor generally comprises annular rotating shrouds with strips (also called seal rings), attached to the disks of the rotor using annular radial flanges.

A disk can be framed by the downstream flange of the upstream seal ring and the upstream flange of the downstream disk, the downstream flange of the seal ring itself being bordered by the downstream flange of the arm of an upstream disk, the entire unit being held in position by a screw-nut assembly.

The strips of a seal ring are placed facing a static portion having a bore including an abradable material capable of resisting high temperatures, so as to reduce convective exchanges between the hot air flow arising from the air stream and the rotor.

Moreover, the strips generally consist of continuous or segmented blades with an annular shape, disposed on the rotor at the flange, while the bore made of abradable material is disposed facing them, on a lower face of the distributor.

A specific ventilation for the disks of the rotor has further been implemented, comprising a flow of pressurized air collected upstream of the turbine, typically at the high-pressure compressor, which is introduced into the rotor for the purpose of cooling its disks, in particular its cells.

To this end, and as illustrated in FIG. 1, lunules 17 (or radial grooves) are formed circumferentially on a downstream face 18 of the radial flange 11 of the upstream seal ring 8 of a rotor disk 1, so as to bring the flow of pressurized air to the cells of the rotor disk.

More precisely, these lunules 17 are disposed between bores 20 designed for the passage of the assembly screws 21, these bores 20 being accomplished on a scalloping including a plurality of scallops 19 extending radially from the flange 11.

Said lunules 17 are customarily machined directly in the mass of the radial flange 11, and include a portion limiting the flow rate upstream of the flow direction and an oblique non-limiting portion made on the chamfer of the seal ring.

The portions of the lunules 17 calibrating the ventilation flow rate have, however, a reduced cross-section, which involve the use of tools having a very small radius for their machining.

FIGS. 2a and 2b highlight the fact that the shapes thus created include surface portions having a very small radius of curvature and cause high stress concentration coefficients at the lunules.

With reference to FIG. 2a, a strong stress concentration is located at the lunules, more precisely at the portions comprising the shortest radii of curvature as illustrated in FIG. 2b.

This phenomenon is harmful to the lifetime of the part.

GENERAL PRESENTATION OF THE INVENTION

One aim of the invention is to increase the lifetime of the seal ring.

Another aim of the invention is to reduce the stress concentration in the most heavily stressed zones of the part.

According to one aspect, the invention proposes a turbine rotor, of a low-pressure turbine of a turbine engine for example, comprising:
  a first disk,
  a second disk,
  an annular seal ring comprising a radial flange on which is formed a scalloping defined by a plurality of scallops offering a locally increased surface, circularly distributed, said radial flange being attached to the rotor between the first disk and the second disk, and
  a flow circuit including at least one lunule, configured to place into fluid communication a radially inner cavity and a radially outer cavity, the lunule being formed on the radial flange of the seal ring, the rotor being characterized in that the lunule is provided on at least one scallop.

Such a rotor is advantageously completed by the following different features, taken alone or in combination:
  the lunule includes a radially inner portion protruding into the radially inner cavity and a radially outer portion in fluid communication with an outlet portion of lunule, the outlet portion protruding into the radially outer cavity;
  at least one bore is made on at least one scallop;
  the assembly of the first disk, the second disk and the seal ring is performed by means of at least one screw nut assembly, the screw being inserted into at least one bore passing through the first disk, a scallop and the second disk;
  the lunule includes a radially outer portion in fluid communication with an outlet portion of lunule, the outlet portion of lunule being inclined with respect to the radially outer portion of lunule;
  at least one bore is made on at least one scallop, and at least one toroidal counterbore is made at the scallop bores, the lunule including a radially inner portion and a radially outer portion, the toroidal counterbore placing into communication the radially inner portion and the radially outer portion of the lunule;

the lunule includes a radially inner portion, a radially outer portion and a toroidal counterbore placing into communication the radially inner portion and the radially outer portion, the radially inner portion of lunule having a cross-section such that the flow rate allowed by the radially outer portion of lunule and the toroidal counterbore is greater than the flow rate allowed by the radially inner portion of lunule;

the lunule includes a radially inner portion and a radially outer portion, the radially inner portion of lunule includes a surface having a first minimum radius of curvature, the radially outer portion of lunule includes a surface having a second minimum radius of curvature, the second minimum radius of curvature being greater than the first minimum radius of curvature;

the lunule includes a radially inner portion and a radially outer portion, the radial flange further includes an annular portion, at least one of the scallops includes a crest, the radially outer portion being provided on the annular portion of the radial flange, the radially inner portion being provided on said crest of the scallop;

each one of the scallops includes a crest, the radially outer portion of the corresponding lunule being provided on the annular portion of the radial flange, the radially inner portion of said corresponding lunule being provided on the crest of the scallop;

the lunule extends along an axis and a bore is formed in the scallop and extends along a second axis, the axes of the lunule and of the bore being coplanar.

According to another aspect, the invention relates to a turbine, particularly a low-pressure turbine, comprising such a rotor.

According to another aspect, the invention relates to a turbine engine, including such a turbine.

PRESENTATION OF THE FIGURES

Other features and advantages of the invention will be revealed from the description that follows, which is purely illustrative and not limiting, and must be read with reference to the appended figures in which.

DESCRIPTION OF ONE OR MORE IMPLEMENTATIONS AND EMBODIMENTS

The embodiments described hereafter relate most particularly to the case of a low-pressure turbine, comprising a series of distributors (or stators) alternating along the axis X of rotation with a series of movable disks (or rotor). This is not limiting, however, in that the turbine could comprises a different number of states, and that the invention can also be applied in a high-pressure turbine, which can be single- or multistage.

Figure 3:
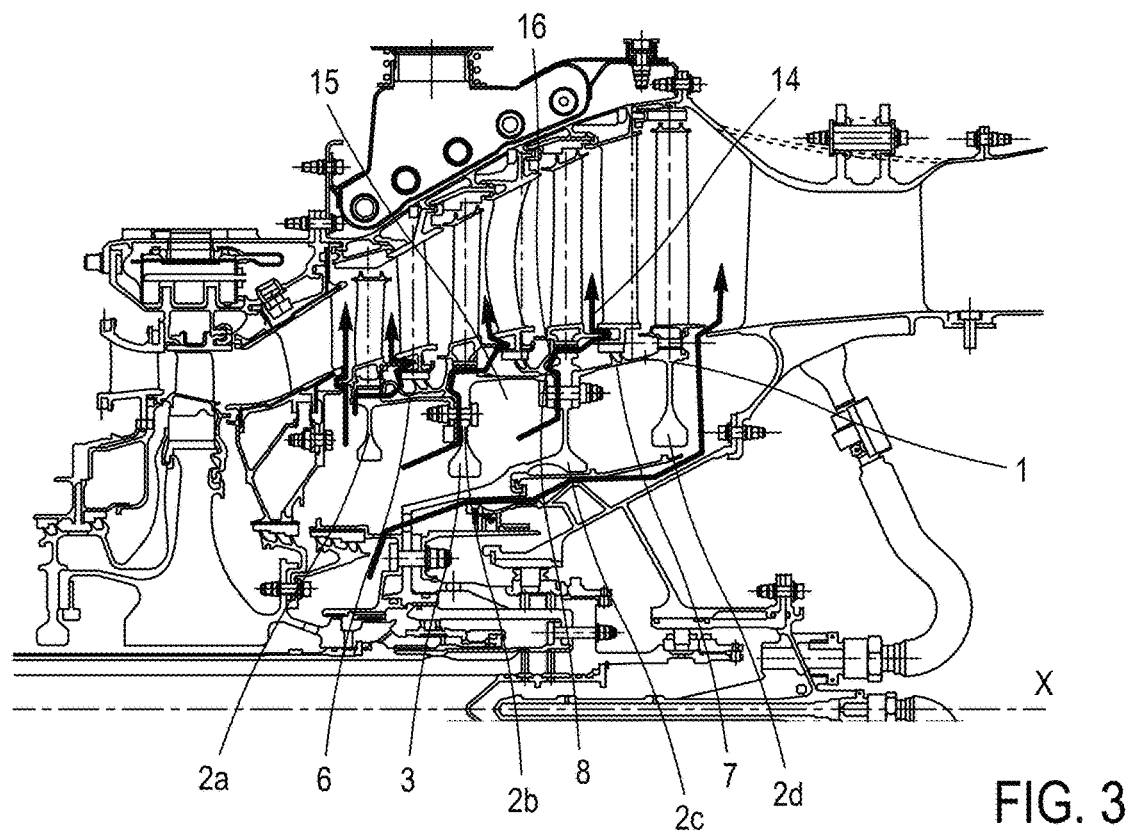
FIG. 3 is a schematic representation showing a profile section view of a low-pressure turbine of a turbojet.

With reference to FIG. 3, the turbine conventionally includes one or more stages, each consisting of a distributor followed by a rotor 1 (or impeller).

The rotor 1 has an axis X of revolution which corresponds to a main axis of the turbine engine and comprises several disks 2, for example four disks 2, each comprising a hub 3 extending radially inward in the direction of the axis X. Peripheral grooves such as the cells 4, in which the movable blades 5 are slotted, are formed in a rim of the hubs 3.

In the entire present text, upstream and downstream are defined by the direction of flow of gasses in the turbine engine.

The definitions of the axial and radial directions refer to the axis X of the turbine engine.

The different disks 2 of the rotor 1 can in particular be assembled coaxially, for example by bolting. The first and second disks 2a and 2b then include a downstream arm 6 which extends downstream from the radial downstream face of each of the disks 2a and 2b, the fourth disk 2d including, for its part, an upstream arm 7 extending upstream from the radial upstream face of the disk 2d.

In order to ventilate the cells 4 of the disks 2 of the rotor 1, a flow of pressurized air can be collected upstream of the turbine, typically at the high-pressure compressor, and be introduced into the cells 4 so as to cool the disks 2.

For this purpose, the rotor 1 comprises a ventilation system 14 for each disk 2, comprising the flow circuit 9 suitable for placing into fluid communication a radially inner cavity 15, into which the hub 3 of the disk 2 extends, and a radially outer cavity 16, delimited by the seal ring 8 and the upstream 7 or downstream 6 arms of the disks 2.

The second and third disks 2b and 2c also includes upstream seal rings 8 allowing the ventilation circuit 14 of the cooling flow of the disks 2 to be formed.

The seal ring 8 can conventionally comprise strips 10 on an outer radial face.

The seal ring 8 is attached to the disk 2 by means of a radial annular flange 11.

Figure 1:
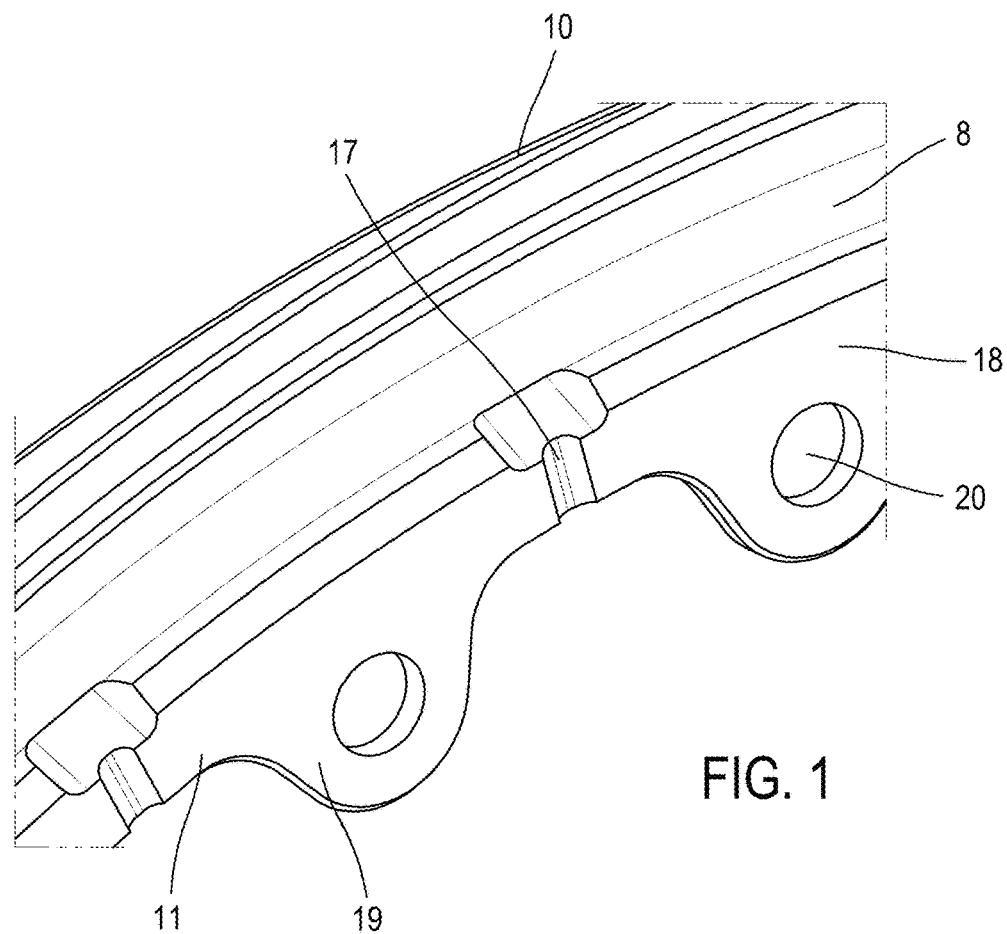
FIG. 1 is a 3D model showing a seal ring including lunules formed on the downstream face of its radial flange.
Figures 2A, 2B:
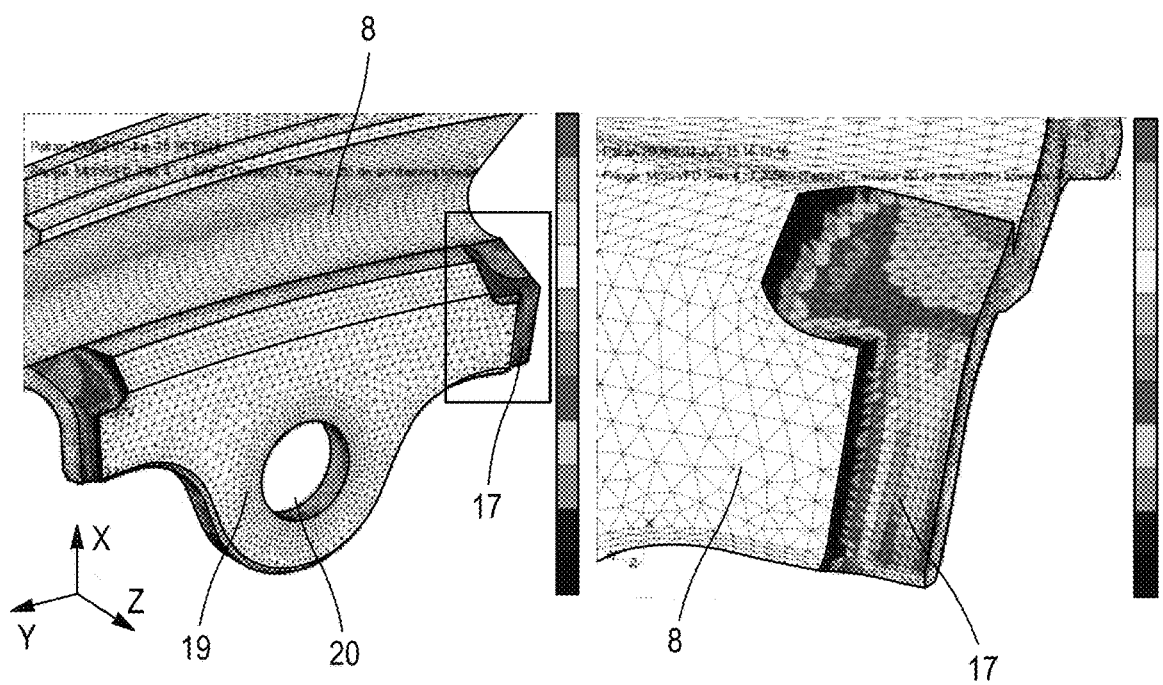
FIG. 2a is a finite-element model showing the spatial distribution of the stresses during loading of the seal ring.
FIG. 2b is a finite-element model showing the distribution of stresses during loading of the seal ring at a lunule.

In the exemplary embodiment illustrated in FIGS. 1 and 2, the radial flange 11 extends radially with respect to the axis X between the flange 13 of the downstream arm 6 of an upstream disk (2b, for example) and a downstream disk (2c for example).

The downstream disk 6, the disk 2 and the radial flange 11 can in particular be attached together by means of an assembly screw 21 and a nut 24.

Figure 4:
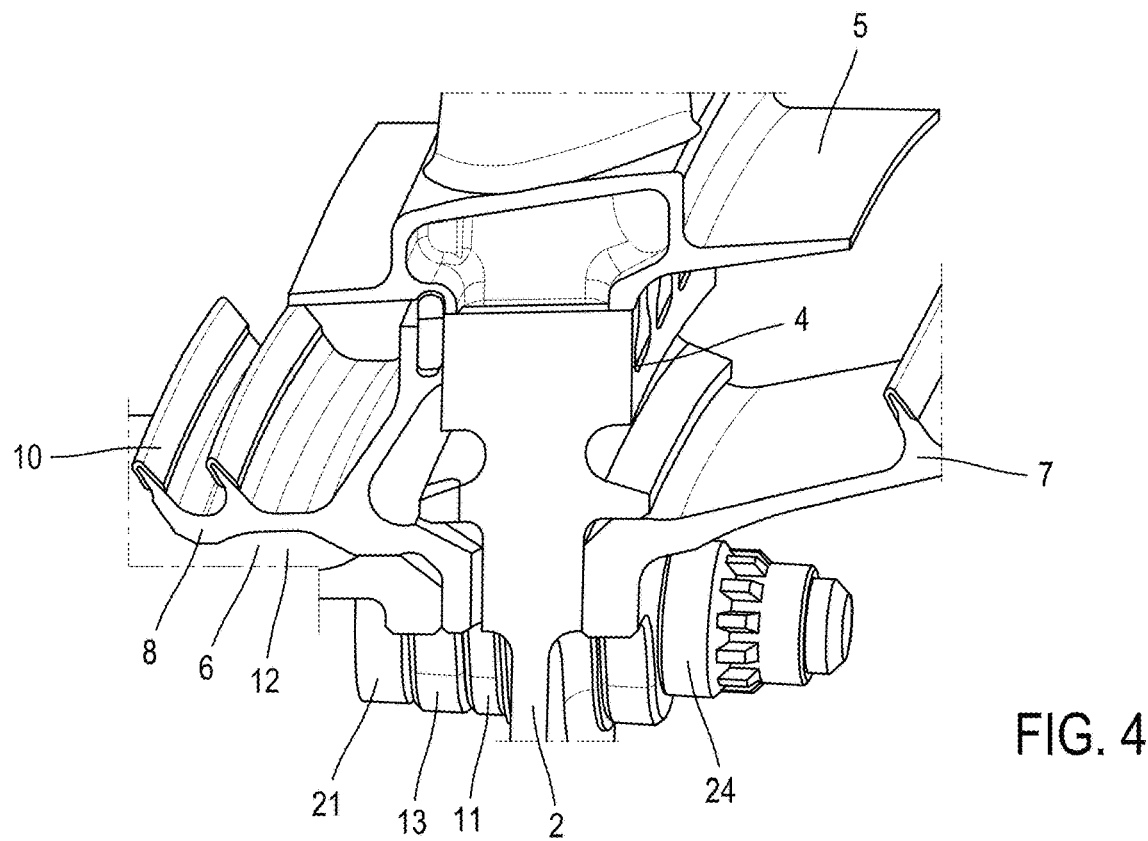
FIG. 4 is a 3D model showing the assembly accomplished between a disk, a seal ring, a downstream arm of an upstream disk and an upstream arm of a downstream disk.

In the embodiment illustrated in FIGS. 3 and 4, the downstream arm 6 of the disk 2b comprises a substantially axial portion 12 (shroud) with respect to the axis X, which extends between the disk 2b and the flange 11 of the seal ring 8, and a radial flange 13 with respect to the axis X, which corresponds to the free end of the downstream arm 6.

The downstream arm 6 can then be attached both to the flange 11 of the seal ring 8 and to the downstream disk 2c by means of their radial portions.

The flow circuit 9 (visible in FIG. 5) comprises a series of radial lunules 17, forming circulation channels of the flow of pressurized air from the radially inner cavity 15 toward the radially outer cavity 16.

In fact, the attachment of the flange 13 to the downstream arm 6 of the upstream disk 2b and of the downstream disk 2c to the radial flange 11 is sealed. The flow of pressurized air can only use the circulation channels thus formed.

The cross-section of the lunules 17 is selected so as to allow sufficient ventilation of the disks 2 of the rotor 1 while still limiting the flow rate of pressurized air collected upstream of the combustion chamber to avoid too great a deterioration in the performance of the turbojet.

As for the lunules 17, they can comprise grooves extending radially with respect to the axis X of revolution of the rotor 1.

Figure 5:
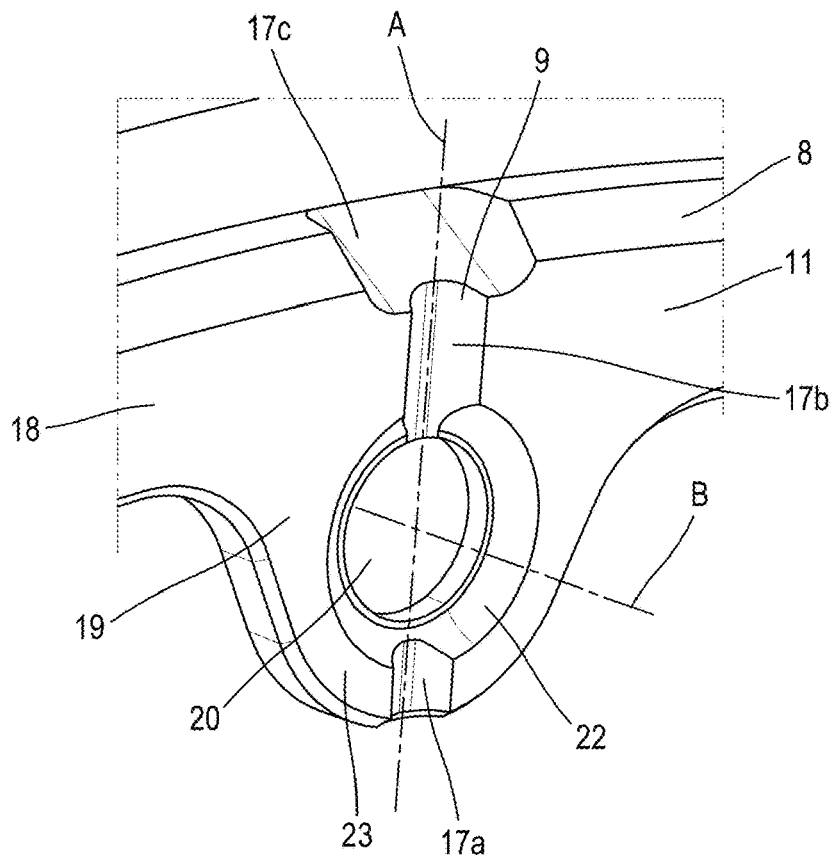
FIG. 5 is a 3D model showing a lunule formed at the bore of a scallop element.

According to a first embodiment illustrated in FIG. 5, the lunules 17 are formed in the downstream face 18 of the radial flange 8, more precisely at the scallops 19 offering a locally increased surface to allow the bores 20 designed for the assembly screws 21.

In order for the lunules 17 to be in fluid communication with the radially inner cavity 15, they extend until the crest 23 of the scalloping 19.

Moreover, in order for the lunules 17 to be in fluid communication with the radially outer cavity 16, they extend until they protrude into said cavity 16, leading to a outlet portion 17c, inclined in this embodiment and formed on a chamber and having a greater cross-section.

The axis A of the lunule 17 being coplanar with the axis B of the bore 20, a toroidal counterbore 22 is formed around the bore 20 to guarantee the continuity of the flow circuit 14 once the assembly is accomplished.

A lunule 17 therefore includes at least four distinct portions:
  A radially inner upstream portion 17a in communication with the radially inner cavity 15 and the toroidal counterbore 22;
  The toroidal counterbore 22 allowing the cooling flow to flow around the screw 21 despite the head loss that this causes, and therefore placing in communication the radially inner upstream lunule portion 17a and a radially outer downstream portion 17b;
  The radially outer downstream portion 17b in communication with the toroidal counterbore 22 and the outlet portion 17c;
  The outlet portion 17c in communication with the downstream portion 17b and leading to the radially outer cavity 16.

Figure 6:
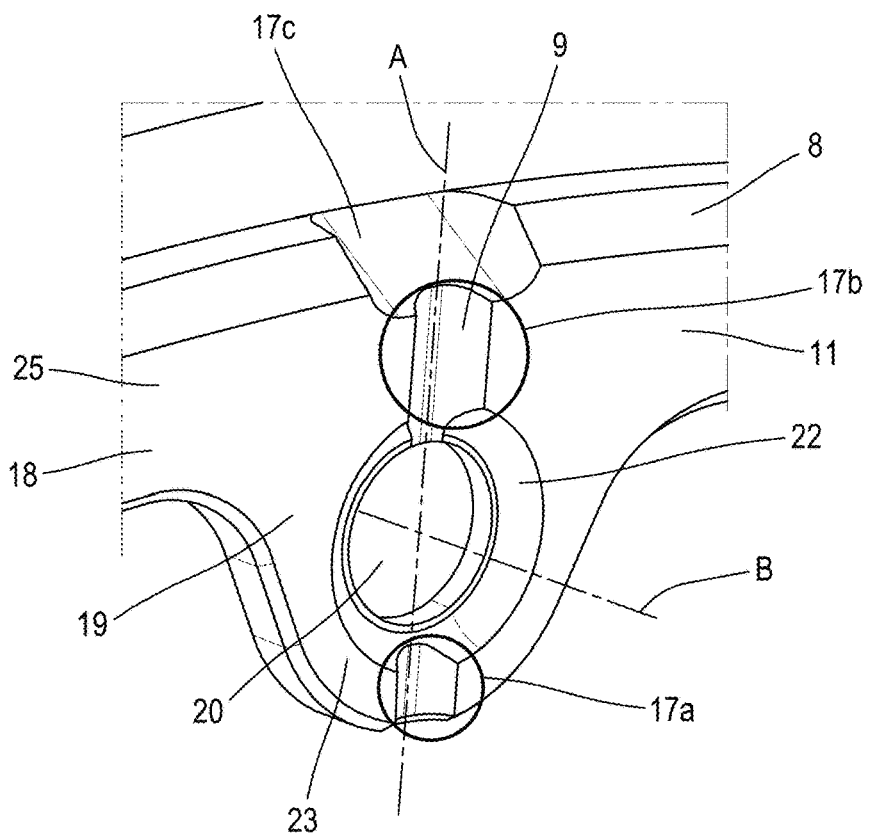
FIG. 6 is a 3D model of the lunule shown in FIG. 5 highlighting the calibrating or non-calibrating portions of the lunule for the cooling flow rate of the disks.

In FIGS. 5 and 6, the upstream 17a and downstream 17b portions are shown extending radially. In a variant, not shown, the portions can not be oriented strictly radially with respect to the axis of revolution of the rotor. Likewise, the outlet portion 17c can be inclined, or not, with respect to the portions 17a and 17b.

The location of the lunules 17 at the scallops 19 thus allows the effects of stress concentrations to be limited by localizing the calibrating portion of the cooling flow in the crest 23 of the scallops 19, which is a zone incurring almost no mechanical stress.

In order to preserve the performance of the turbojet, the cooling flow of the disks collected upstream of the combustion chamber is calibrated thanks to a restricting passage limiting the flow rate of the flow.

This restricting passage is formed by the upstream portion 17a of the lunules, the very reduced cross-section of which is configured to naturally limit the flow rate of the cooling flow.

With reference to FIG. 6, to simplify the regulation of this flow rate, only the upstream portion 17a of the lunules is dimensioned to limit it. The other portions of the lunule therefore have a larger cross-section than the cross-section of the upstream portion 17a, in particular so that the head loss effects along the lunule 17 do not affect the calibration of the flow rate of the cooling flow.

The upstream portion 17a of the lunules therefore has a surface including shorter radii of curvature than the other lunule portions 17. The stress-concentration coefficients are therefore the most critical in the zone including the upstream portions 17a of the lunules.

The least mechanically constrained zone of the flange being the scallop crest 23, which is therefore in contact with the radially inner cavity 15, the upstream portions 17a of the lunules are formed on these scallop 19 crests 23.

The other lunule portions 17b and 17c have a larger cross-section, therefore including surfaces having larger radii of curvature and limiting the stress concentration as a result.

This limitation of stress concentration in the annular portion 25 of the radial flange 11, being the most heavily loaded zone mechanically, allows an increase in the lifetime of the seal ring 8.

The invention claimed is:

1. A turbine rotor, of a low-pressure turbine of a turbine engine, comprising:
   a first disk,
   a second disk,
   an annular seal ring comprising a radial flange on which is formed a plurality of scallops offering a locally increased surface, circularly distributed, said radial flange being attached to the rotor between the first disk and the second disk, and
   a flow circuit including at least one lunule, configured to place into fluid communication a radially inner cavity and a radially outer cavity, the lunule being formed on the radial flange of the seal ring, said lunule being provided on at least one of the plurality of scallops,
   wherein the assembly of the first disk, the second disk and the seal ring is performed by means of at least one screw nut assembly, the screw being inserted into at least one bore passing through the first disk, one of the plurality of scallops and the second disk.

2. The rotor according to claim 1, wherein the lunule includes a radially inner portion protruding into the radially inner cavity and a radially outer portion in fluid communication with an outlet portion of lunule, the outlet portion protruding into the radially outer cavity.

3. The rotor according to claim 1, wherein at least one bore is made on at least one of the plurality of scallops.

4. The rotor according to claim 1, wherein the lunule includes a radially outer portion in fluid communication with an outlet portion of lunule, the outlet portion of lunule being inclined with respect to the radially outer portion of lunule.

5. The rotor according to claim 1, wherein at least one bore is made on at least one of the plurality of scallops, and at least one toroidal counterbore is made at the scallop bores, the lunule including a radially inner portion and a radially outer portion, the toroidal counterbore placing into communication the radially inner portion and the radially outer portion of the lunule.

6. The turbine rotor according to claim 1, wherein the lunule includes a radially inner portion, a radially outer portion and a toroidal counterbore placing into communication the radially inner portion and the radially outer portion, the radially inner portion of lunule having a cross-section such that the flow rate allowed by the radially outer portion of lunule and the toroidal counterbore is greater than the flow rate allowed by the radially inner portion of lunule.

7. The turbine rotor according to claim 1, wherein the lunule includes a radially inner portion and a radially outer portion, the radially inner portion of lunule includes a surface having a first minimum radius of curvature, the radially outer portion of lunule includes a surface having a second minimum radius of curvature, the second minimum radius of curvature being greater than the first minimum radius of curvature.

8. The turbine rotor according to claim 1, wherein the lunule includes a radially inner portion and a radially outer portion, the radial flange further includes an annular portion, at least one of the plurality of scallops includes a crest, the radially outer portion being provided on the annular portion of the radial flange, the radially inner portion being provided on said crest of the scallop.

9. The turbine rotor according to claim 8, wherein each one of the scallops includes a crest, the radially outer portion of the corresponding lunule being provided on the annular portion of the radial flange, the radially inner portion of said corresponding lunule being provided on the crest of each said scallop.

10. The turbine rotor according to claim 1, wherein the lunule extends along an axis and a bore is formed in at least one of the plurality of scallops and extends along a second axis, the axes of the lunule and of the bore being coplanar.

11. A low-pressure turbine, characterized in that it comprises a rotor according to claim 1.

12. A turbine engine, characterized in that it comprises a turbine according to claim 1.

\* \* \* \* \*